United States Patent Office.

JAMES C. AYER AND EDWARD HAEFFELY, OF LOWELL, MASSACHUSETTS.

Letters Patent No. 73,865, dated January 28, 1868.

IMPROVED COMPOSITION FOR COLORING HAIR.

The Schedule referred to in these Letters Patent and making part of the same.

Be it known that we, JAMES C. AYER and EDWARD HAEFFELY, both of Lowell, in the county of Middlesex, and Commonwealth of Massachusetts, have invented a new and improved Composition for Coloring and Dressing the Human Hair; and we do hereby declare that the following is a full and exact description thereof.

The nature of our invention consists in combining the tartro-plumbite of soda or potash with glycerine and water.

To enable others skilled in the art to make and use our invention, we will proceed to specify the proportion of each ingredient used, and the mode and order of their admixture.

We dissolve in water nine pounds of acetate of lead. To this we add nine pounds of cream-tartar, dissolved in as little water as will take it up. The resulting insoluble white precipitate of tartrate of oxide of lead we wash twice in cold water. This precipitate, thus cleansed, we dissolve in thirty pounds of a solution of caustic soda, of specific gravity 1.07, and it forms a solution of the tartro-plumbite of soda, containing thirteen pounds of anhydrous tartro-plumbite of soda. To this solution we add sufficient water to make the whole quantity thirteen gallons, and we then add six and one-half gallons of glycerine; and this gives the composition for coloring and dressing the hair.

By substituting a solution of caustic potash, in equivalent quantity, for the solution of caustic soda, the result is a solution of the tartro-plumbite of potash. To this add water and glycerine, as above.

The composition may be varied in its proportions, but those we have given we consider the best.

The ingredients also may be varied, and nearly the same result may be obtained, by the use of the oxalo-plumbite of soda or potash, or the formio-plumbite of soda or potash, instead of the tartro-plumbite of soda or potash. Spirits also may be used in the composition; but we prefer to use the ingredients above stated and in the proportions specified.

What we claim as our invention, and desire to secure by Letters Patent, is—

The combination of the tartro-plumbite of soda or potash, the oxalo-plumbite of soda or potash, and the formio-plumbite of soda or potash, either or all of them, with glycerine, spirits, and water, in the proportions above specified, or in any other proportions, for the purpose specified.

JAMES C. AYER,
EDWARD HAEFFELY.

Witnesses:
JONAS P. VARNUM,
J. N. MARSHALL.